United States Patent [19]
Myers

[11] 3,845,868
[45] Nov. 5, 1974

[54] NONSTOP REFUSE COLLECTION SYSTEM
[76] Inventor: Glenn R. Myers, 729 W. Vernan, Phoenix, Ariz. 85007
[22] Filed: Apr. 19, 1972
[21] Appl. No.: 245,679

Related U.S. Application Data
[63] Continuation of Ser. No. 87,445, Nov. 6, 1970, abandoned.

[52] U.S. Cl.............. 214/42 R, 214/302, 214/519
[51] Int. Cl.............................................. B65f 3/02
[58] Field of Search............ 214/39, 42 R, 43, 83 R, 214/302, 519, 82, 520; 198/107; 258/8, 26

[56] References Cited
UNITED STATES PATENTS
1,007,597   10/1911   Newman .......................... 214/42 R
3,083,849   4/1963   Mottin ............................... 214/302
3,576,265   4/1971   Brady ............................. 214/42 R

*Primary Examiner*—Robert J. Spar
*Assistant Examiner*—Lawrence J. Oresky
*Attorney, Agent, or Firm*—John A. Robertson

[57] ABSTRACT

A system for collecting refuse is disclosed comprising a nonstop refuse collection vehicle which is provided with a refuse collection tray adapted for transferring refuse dumped therein to a storage enclosure. The vehicle is provided with means for actuating refuse containers causing them to dump their contents into the tray as the vehicle moves along a collection path.

9 Claims, 13 Drawing Figures

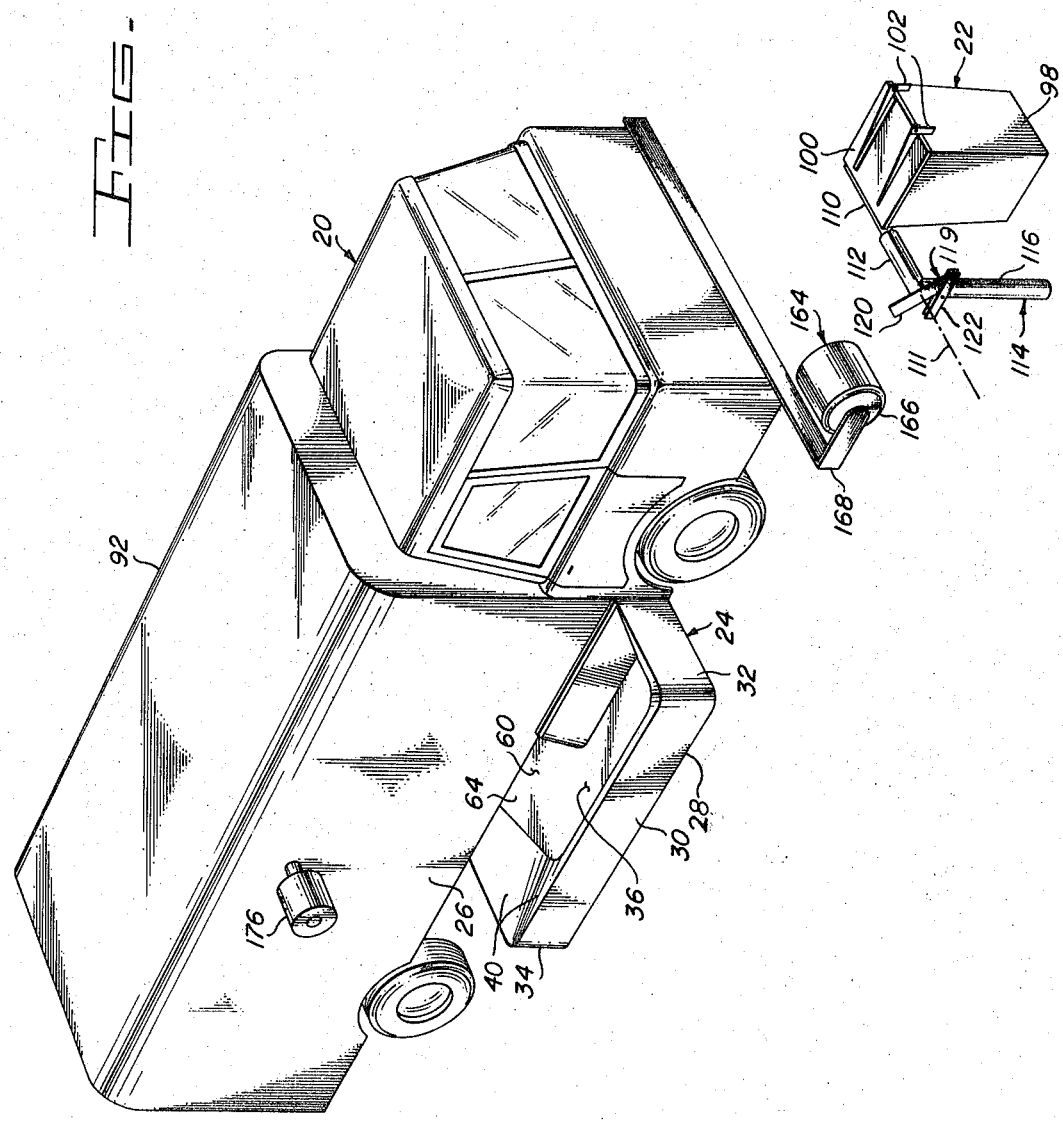
INVENTOR.
GLENN R. MYERS

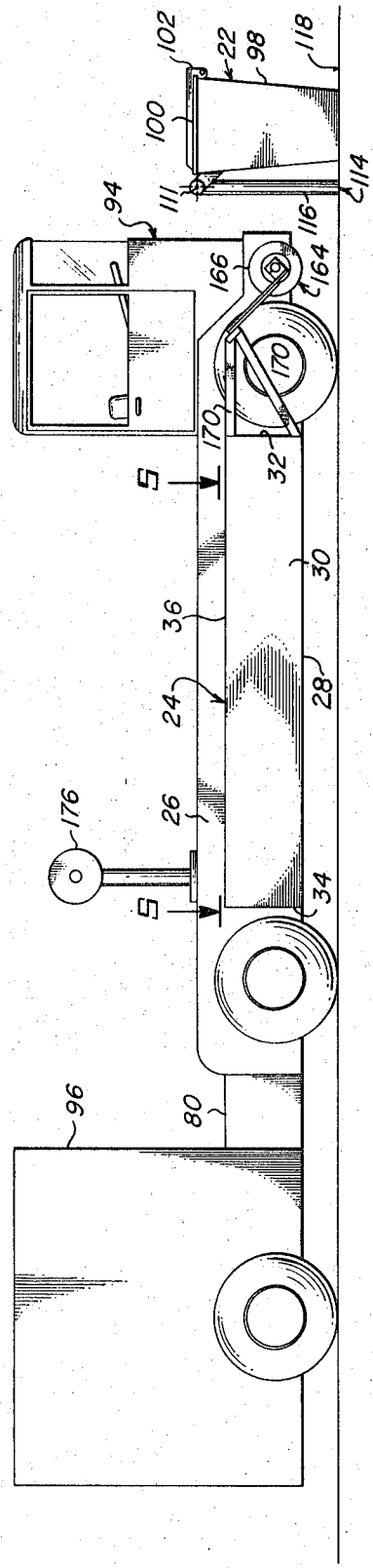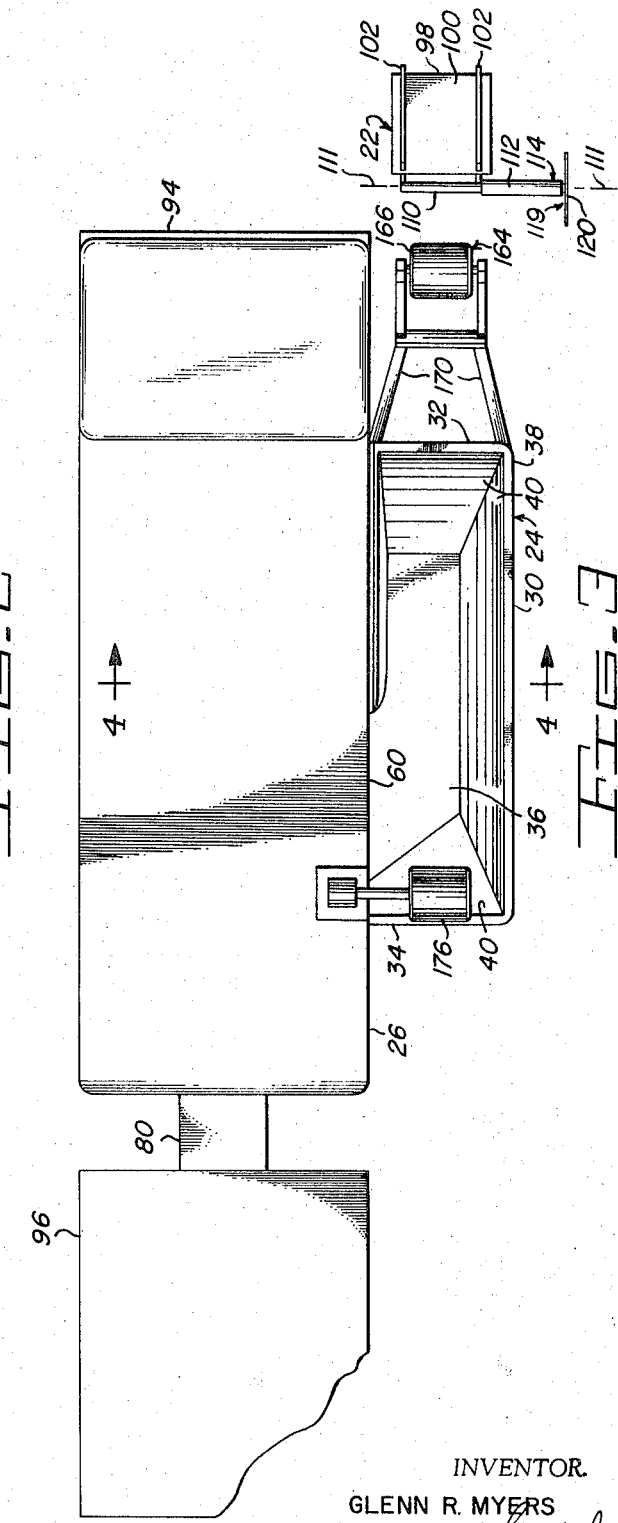

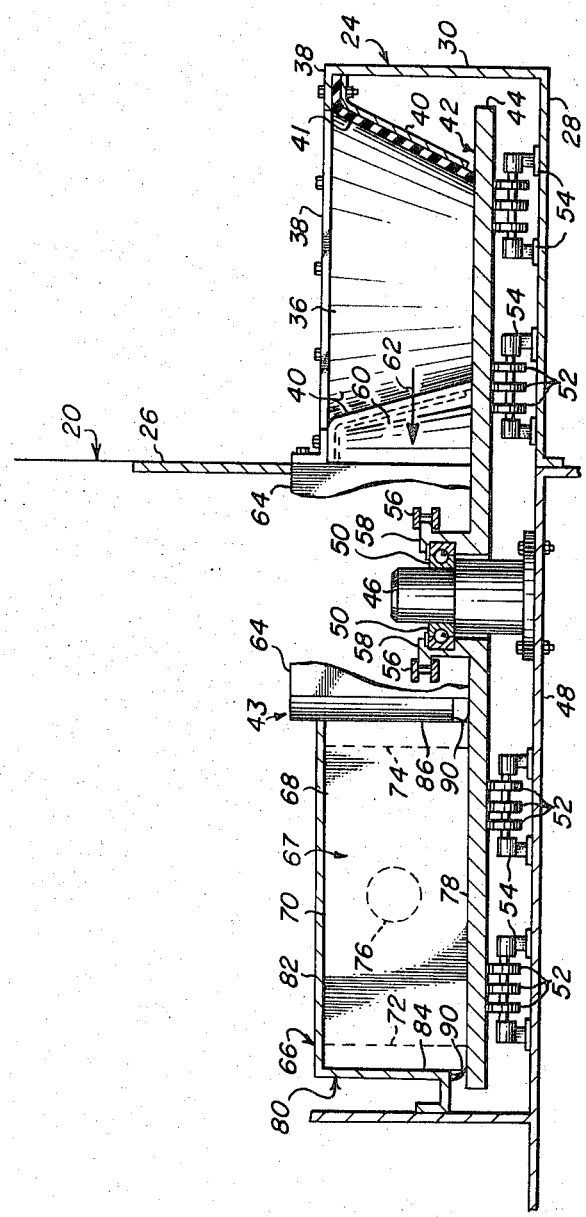

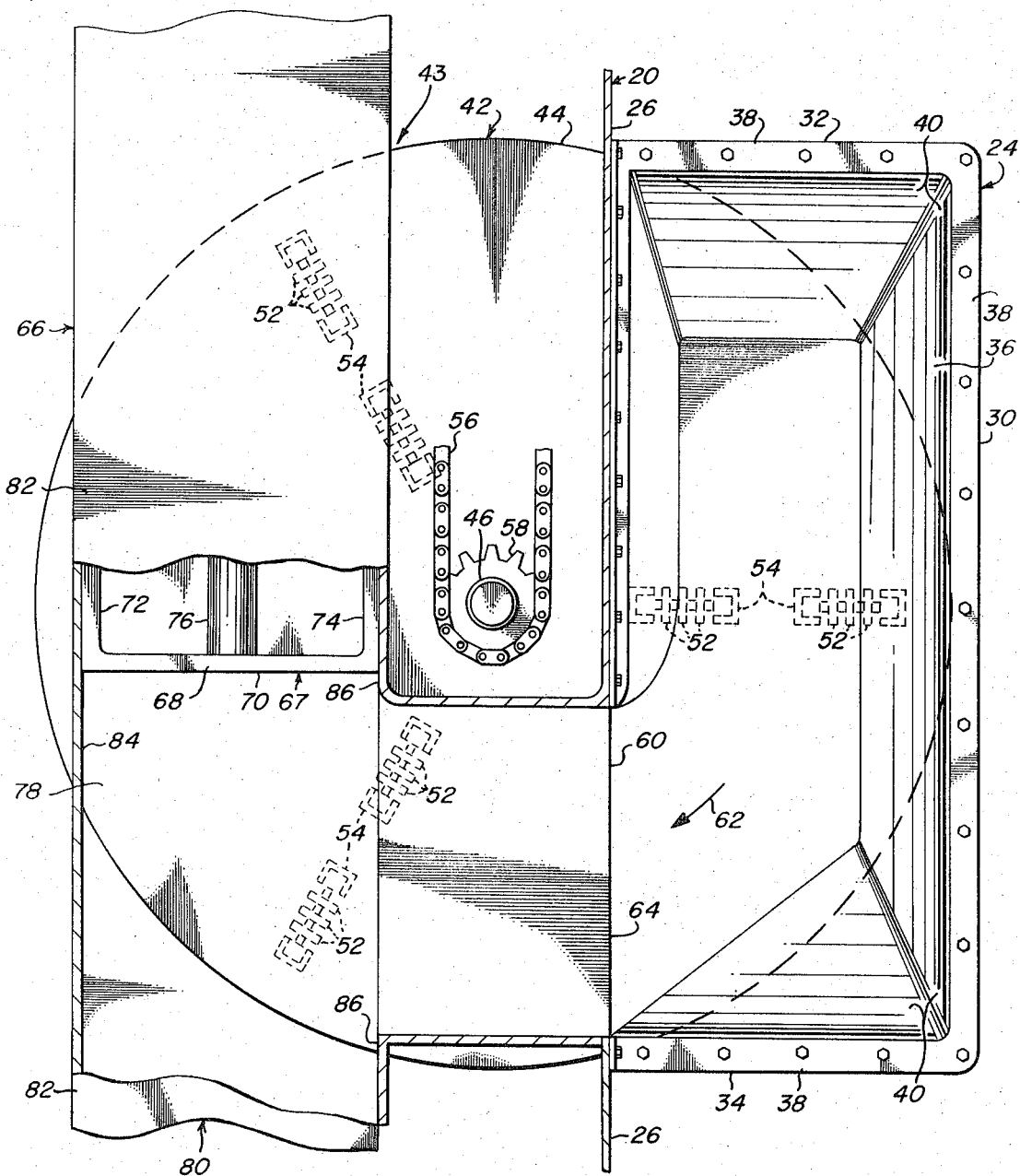

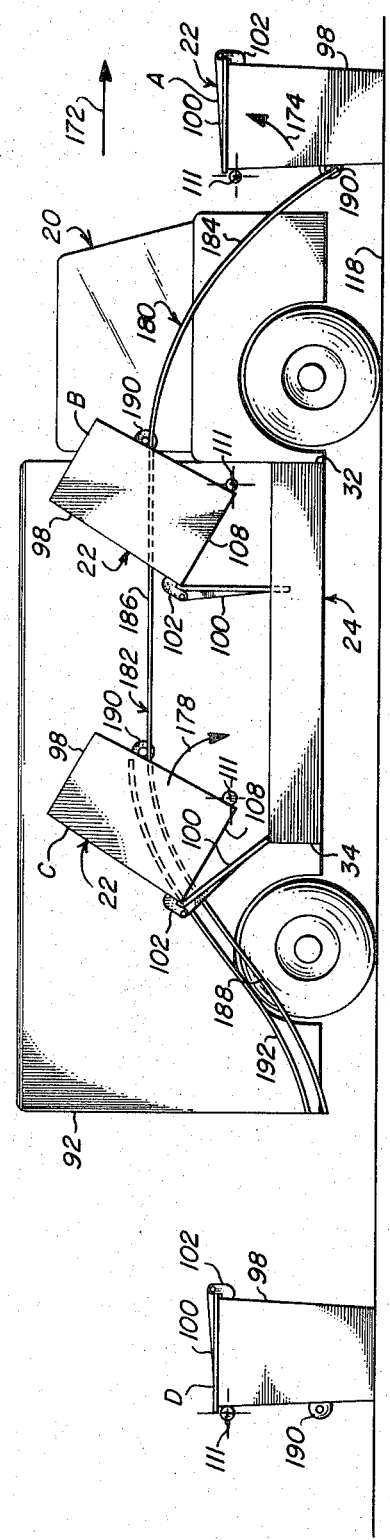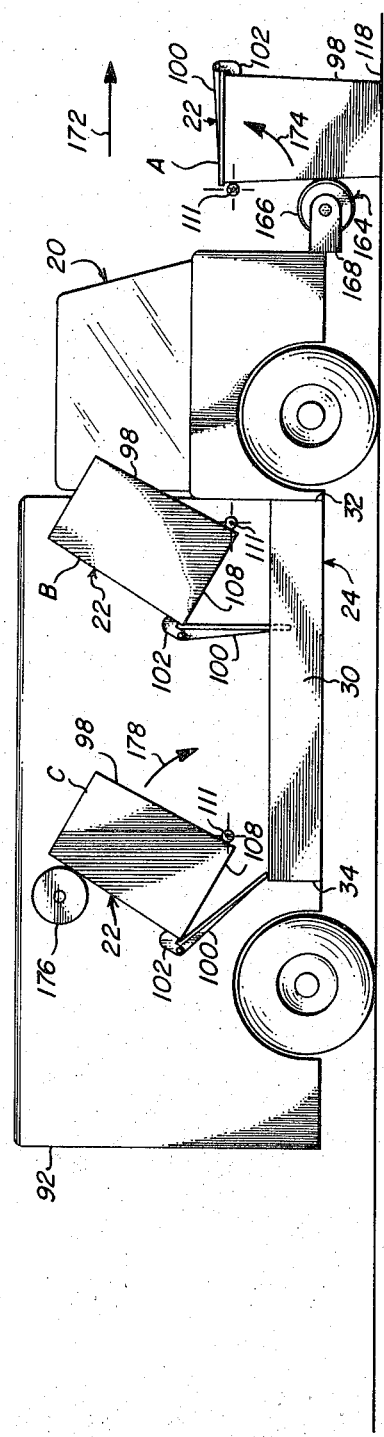

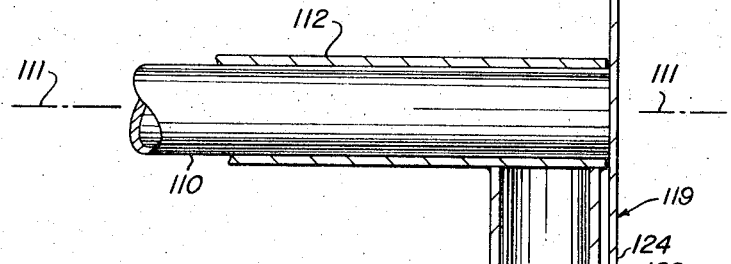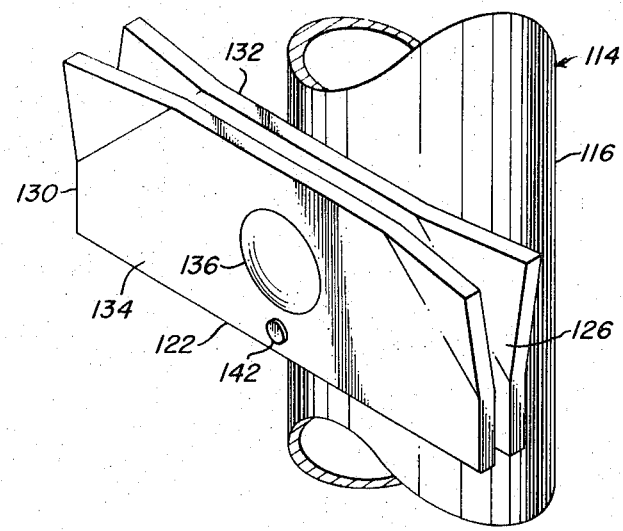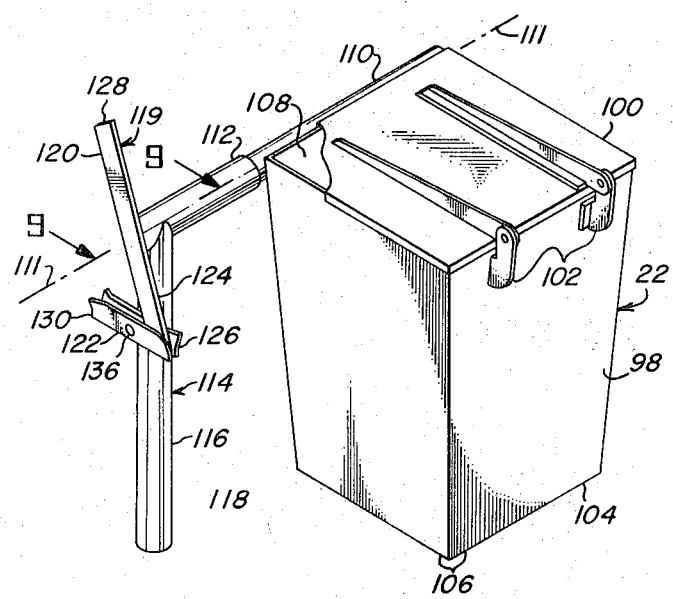

INVENTOR.
GLENN R. MYERS

BY

AGENT

NONSTOP REFUSE COLLECTION SYSTEM

This application is a continuation of the copending application of Glenn R. Myers, Ser. No. 87,445, filed Nov. 6, 1970, for "Nonstop Refuse Collection System," now abandoned.

BACKGROUND OF THE INVENTION

1. Field of the Invention

This invention relates to collection systems and more particularly to a refuse collection system which employs a nonstop refuse collection vehicle and refuse containers for use therewith.

2. Prior Art

The problems associated with the collection of refuse have recently been compounded due to increased numbers of people, residences, business establishments, and also due to increased costs of equipment, personnel, and the like. These problems have spurred recent attempts to streamline the traditional method of collecting refuse.

The traditional method of collecting refuse requires a collection vehicle with a driver and one or two additional men for physically lifting the refuse containers and dumping their contents into the back of the vehicle.

Many problems are associated with this method, among these are personnel problems which arise from the hard physical labor and low pay scale. Another problem is that this system is very time-consuming and inefficient which results in very poor collection schedules. Also, the size of the containers must be limited to the weight a man can lift, generally this is a 20 gallon container. Therefore, to accommodate the amount of refuse generated between pick-up dates, the homeowner or business establishment is likely to have a plurality of containers which means longer stops for the vehicle, thus more delays in the pick-up schedule.

Recently attempts have been made to mechanize the collection of refuse; these attempts have been directed to power-operated devices mounted on the collection vehicle. The power devices are adapted to extend from the vehicle, clamp around a refuse container, hoist it to a position over the open portion of the vehicle, dump the contents of the container and then return it to its original position.

These recent prior art developments have partially solved the problems in that only one operator is needed instead of the traditional three and the size of the refuse containers have been increased. However, the time factor still remains a problem as the collection vehicle must stop at each collection point. In an attempt to alleviate the time problem, a plurality of homeowners or relatively small business establishments were asked to share a common refuse container. This created problems such as inconvenience for the individuals, neighborhood problems and the like.

Also, the newly developed mechanized equipment is costly and the operation of the equipment requires extra training for the operator and additional duties that must be performed by him in conjunction with driving the vehicle.

Therefore, the need exists for a low cost efficient refuse collection system.

SUMMARY OF THE INVENTION

In accordance with the invention claimed, a refuse collection system is disclosed comprising a nonstop collection vehicle which is provided with a refuse receiving receptacle and means for transferring the refuse from the receptacle to a storage enclosure.

In one embodiment of the present invention, refuse containers are pivotally mounted in spaced intervals along a collection path and are adapted to be actuated by means provided on the collection vehicle. As the vehicle proceeds along the collection path, the refuse containers are sequentially pivoted to an inverted position so that each container dumps its contents into the vehicle refuse receiving receptacle and then is pivoted back to its original position.

In another embodiment of the present invention the refuse containers are mounted above the ground on a vertical post and each container is provided with a movable bottom portion. As the refuse collection vehicle proceeds along the collection path the refuse receiving receptacle will pass under each container and actuation means provided on the vehicle will move the bottom portion of the container so that gravity will cause the contents of the container to empty into the tray.

Accordingly, it is an object of this invention to provide a new and useful inexpensive and efficient refuse collection system.

Another object of the present invention is to provide a new and useful refuse collection system in which refuse is collected by a nonstop vehicle.

Another object of the present invention is to provide a new and useful nonstop refuse collection system requiring one operator whose only duty is to drive the collection vehicle.

Another object of the present invention is to provide a new and useful nonstop refuse collection system in which each domicile and business establishment may be provided with an individual large volume refuse container.

Another object of the present invention is to provide a new and useful nonstop refuse collection system in which large volume refuse containers are adapted to dump their contents into a continuously moving collection vehicle.

Another object of the present invention is to provide a new and useful nonstop refuse collection system in which a plurality of refuse containers are spacedly arranged along a collection path so that the containers may be sequentially actuated to dump their contents into a continuously moving collection vehicle.

Another object of the present invention is to provide a new and useful nonstop refuse collection system employing pivotably mounted refuse containers which are actuated by a continuously moving collection vehicle so that the containers are inverted to dump their contents into the vehicle.

Another object of the present invention is to provide a new and useful nonstop refuse collection system employing refuse containers which are fixedly mounted above the ground and are provided with movable bottom portions which are actuated by a continuously moving collection vehicle to empty the contents of the containers into the vehicle.

Another object of the present invention is to provide a new and useful nonstop refuse collection system employing a nonstop collection vehicle having means thereon for actuating refuse containers causing them to eject their contents into the vehicle.

Another object of the present invention is to provide a new and useful nonstop refuse collection system employing a nonstop vehicle having a refuse receiving receptacle thereon.

Still another object of the present invention is to provide a new and useful nonstop refuse collection system employing a nonstop vehicle having means thereon for emptying a refuse receiving receptacle provided thereon.

Yet another object of the present invention is to provide a new and useful nonstop refuse collection system employing a nonstop vehicle which is adapted to receive, shred, compact and transfer refuse to a refuse storage enclosure.

Yet another object of the present invention is to provide a new and useful collection system in which a nonstop collection vehicle is provided with means for continuously emptying a refuse receptacle on the vehicle, said means carrying the refuse from the receptacle to a continuously operating compacting and transfer mechanism which dispatches the refuse to a remote enclosure.

The foregoing and other objects of this invention as well as the invention itself may be more fully understood when read in conjunction with the following drawings.

BRIEF DESCRIPTION OF THE DRAWINGS

FIG. 1 is an isometric view of one embodiment of the present invention illustrating the features thereof;

FIG. 2 is a side elevation of a refuse collection vehicle and a pivotably mounted refuse receptacle of the present invention;

FIG. 3 is a plan view of the mechanism shown in FIG. 2;

FIG. 4 is a sectional view taken on the line 4—4 of FIG. 3;

FIG. 5 is a sectional view taken on the line 5—5 of FIG. 2;

FIG. 6 is a schematic illustration of the side view of the refuse container and refuse collection vehicle illustrating the sequence of operation thereof;

FIG. 7 is similar to FIG. 6 showing a modification thereof;

FIG. 8 is a perspective view illustrating the pivotably mounted refuse container of the present invention;

FIG. 9 is a sectional view taken on the line 9—9 of FIG. 8;

FIG. 10 is an enlarged fragmentary perspective view showing the stop mechanisms of the refuse container illustrated in FIGS. 8 and 9;

DESCRIPTION OF THE PREFERRED EMBODIMENTS

Figure 11:
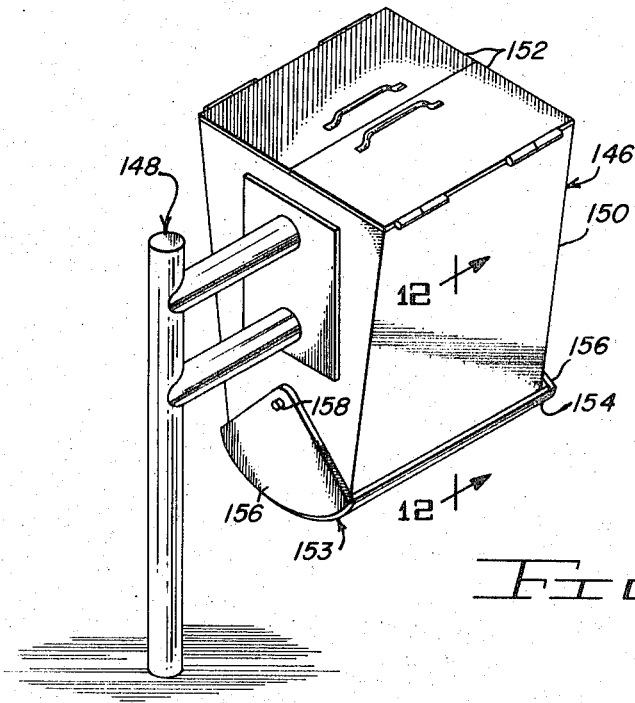
FIG. 11 is a perspective view of another type of refuse container suitable for use with this invention.

Referring more particularly to the drawings, FIG. 1 illustrates a nonstop refuse collection vehicle indicated generally by the reference numeral 20, and a refuse container indicated generally by the reference numeral 22, both being suitable for use with the nonstop refuse collection system of the present invention.

The vehicle 20 may be a conventional truck that has been modified to contain collection and refuse handling mechanisms as will hereinafter be described in detail.

The vehicle 20 is provided with a refuse receiving receptacle or tray 24 which in this embodiment is mounted on the side of the vehicle and extends laterally therefrom. The tray 24 may be fabricated in any convenient geometric shape, and is illustrated and described in this embodiment as being a substantially rectangular structure having a bottom section 28, upstanding sidewall 30, upstanding front and rear walls 32 and 34. Walls 30, 32, and 34 cooperate with a side 26 of the refuse collection vehicle to define the rectangular structure of the tray which is provided with a top opening 36 formed therein.

Each of the walls 32 and 34 of tray 24 are provided with a lip or flange 38 formed on the upper ends thereof which are inwardly directed and are disposed to lay in a substantially horizontal plane with respect to the walls. Suitably attached to the flanges 38 and downwardly, angularly depending therefrom there is provided a deflector member 40 for directing the refuse dumped into the tray towards the center thereof. Deflector member 40 may be provided with a sound deadening layer 41 which may be rubber, neoprene, or any other suitable material which will dampen the noise associated with a dumping of refuse into the tray, The vehicle 20 is provided with a removal means 43 for moving the refuse from the tray to a suitable storage enclosure. Removal means 43 comprises tray emptying means 42 and a transfer means 66 as will hereinafter be described in detail.

Emptying means 42 may comprise a substantially circular disc 44 positioned within the lower portion of the vehicle 20 and extending laterally therefrom into the lower portion of the tray 24. The vehicle 20 is provided with an upstanding trunion 46, suitably attached to the floor or frame 48 of the vehicle, about which the disc 44 is journaled for rotation in bearings 50. The disc and trunion are positioned so that slightly less than one hemisphere of the disc extends from the vehicle into the lower portion of the refuse receiving tray.

To provide lateral support for the relatively large surface area of rotating disc 44, the floor 48 of vehicle 20 as well as a bottom portion 28 of the tray 24 are provided with rollers 52 journaled in pillow blocks 54. The rollers are spacedly arranged so as to contact the lower surface of the disc thus supporting its weight and the weight of the refuse which is dumped thereon.

The disc 44 may be driven by conventional methods which are well known in the art, and is shown in this embodiment as receiving continuous rotational motion from an endless chain 56 which is coupled to a sprocket 58 formed concentric with and axially extending from the disc. The other end (not shown) of chain 56 may be coupled to a conventional power take-off device which is driven by the vehicle's power plant. Another method of driving the disc (not shown) would be to drive one or more of the rollers 52 so that their frictional engagement with the lower surface of the disc would impart rotational motion thereto.

Emptying means 42, as hereinbefore described and illustrated, is shown as a horizontally disposed rotating disc 44. It should be understood that this is merely one method of accomplishing the desired emptying of the tray. For example, an endless driven belt (not shown) would be a functional equivalent.

As best seen in FIGS. 4 and 5, the side 26 of refuse collection vehicle 20 is provided with an opening 60 formed in the lower portion thereof through which the refuse is carried in the direction of arrow 62.

Refuse traveling through the opening 60 of the vehicle 20 may be directed through a shredding device 64 which may be a hammer-mill or other similar device adapted for shredding the refuse routed therethrough. It should be noted that the shredding device 64 is not a necessary item to the operation of this system, but is only an added feature which would enable the refuse to be more compactly stored within a refuse storage enclosure.

The refuse carried from the tray 24 by the emptying means 42 will enter through the opening 60 in the side of the vehicle, and from there may pass through the shredding device 64 and then into the transfer means 66.

Transfer means 66 comprises a ram means 67 contained within a chute 80 which is adapted to receive refuse from the emptying means 42 and carry the refuse to a storage enclosure as will hereinafter be described in detail.

Ram means 67, as best seen in FIGS. 4 and 5, comprises a substantially U-shaped reciprocating piston 68, having a pusher surface 70 with piston skirts 72 and 74. A piston rod 76 suitably attached to the piston 68 provides reciprocal motion to the piston from any suitable drive means (not shown) such as conventional hydraulic equipment.

Piston 68 is positioned for contiguous engagement with the upper surface 78 of the disc and the reciprocating motion of piston 68 follows a chord with respect to the circumference of the disc 44. The piston 68 is contained within a chute 80 having an upper frame member 82 and vertical spaced apart wall members 84 and 86. As best seen in FIGS. 4 and 5, vertical wall member 86 is a continuation of the side wall of opening 60 which curves around the disc mounting trunion 46 and drive hardware to prevent this equipment from being contaminated with refuse. The inwardly facing surface of the vertical spaced apart walls 84 and 86 may be provided with suitable scrappers 90 on the lower end thereof to prevent refuse from moving laterally with respect to the disc.

The chute 80 continues beyond the edge of the disc so that the refuse may be transferred from the disc to suitable refuse storage enclosures. The pistons 68 being reciprocally operable within the chute 80 will scrape the refuse from the upper surface of the disc and transfer it along the length of the chute and ultimately into a storage enclosure.

It should be noted that the hereinbefore described piston 68 is one type of ram means and another type of ram means (not shown) would be a continuously rotating screw or auger mounted within a substantially tubular chute having an opening formed in the top thereof into which refuse is deposited from the emptying means.

The refuse collection vehicle 20 as shown in FIG. 1 is self-contained unit including a storage enclosure 92. Transferal of the refuse to enclosure 92 may be accomplished by any method which would take refuse from the lower portion of the vehicle and transfer it to the self-contained storage enclosure 92.

Another type of refuse collection vehicle 94 is illustrated in FIGS. 2 and 3. This vehicle 94 as shown is a specially designed vehicle containing only the tray and removal mechanisms hereinbefore described. A refuse storage trailer 96 may be coupled to the rear portion of the vehicle 94 in any conventional manner, and as shown, would employ an elongated chute 80 which extends from the rear portion of the vehicle and is coupled to the trailer. The chute 80 and the ram means 67 contained therein would transfer the refuse from the collection vehicle into the trailer. The trailer may be adapted for quick disconnect from the vehicle 94 so that when the trailer 96 is full it may be dropped at a collection point and a new trailer quickly coupled to the back of the vehicle.

Many types of refuse containers may be designed for quickly dumping or ejecting their contents into the nonstop collection vehicle of the present invention and two basic types of containers will hereinafter be described in detail.

As best seen in FIGS. 1, 2, 3, 8, 9 and 10 the refuse container 22 comprises a container body or housing 98 having a lid 100 movably mounted thereon by hinges 102. The housing 98 is shown as a substantially rectangular structure having a bottom 104 with four upstanding spaced-apart substantially vertical walls 106, the upper ends of which circumscribe a refuse receiving opening 108.

The container is positioned adjacent to the collection path by mounting means 114 which comprises a pivot bar 110, a sleeve 112 and a mounting post 116.

The pivot bar 110 is a horizontally disposed member which is attached to the container housing 98 and is carried in the horizontally disposed sleeve 112. The pivot bar is journaled within the sleeve for rotational movement about axis 111. The sleeve 112 is attached to the post 116 which is mounted in the ground 118.

A brake means 119 is provided to stop the rotational movement of the container housing 98 at an upright position and also at an inverted position. The brake means 119 is adapted to yieldingly hold the container in these positions.

The brake means 119, as shown in this embodiment, comprises a stop bar 120, coupled for rotation with the container housing 98, and a double-ended stop mechanism 122 attached to the mounting means 114 and positioned thereon to engage the stop bar.

As shown best in FIG. 8, when the housing 98 is in its upright or refuse receiving state, one end 124 of stop bar 120 is yieldingly held in one end 126 of stop mechanism 122. When the housing 98 is pivoted into an inverted or refuse dumping state, the other end 128 of stop bar 120 will move with the housing and will be stopped and yieldingly held in the other end 130 of stop mechanism 122. As best seen in FIG. 9, stop mechanism 122 is a double-ended clevis type device having a fixed plate 132 mounted to the post 116, and a movable plate 134 outwardly disposed with respect to plate 132. Movable plate 134 is biased toward fixed plate 132 by a suitable biasing means which may comprise a bolt 136 which passes through the plates 134 and 132, into the internal portion of the post 116 and is provided on its internal end with a spring 138 which exerts a biasing force between a nut 140 and the internal portion of the post 116 to force the plates into holding engagement with the stop bar 120. The fixed plate 132 is provided with a pin 142 thereon which extends outwardly and slideably engages an aperture 144 provided in movable plate 134 to prevent rotation of plate 134 with respect to plate 132.

Figure 12:
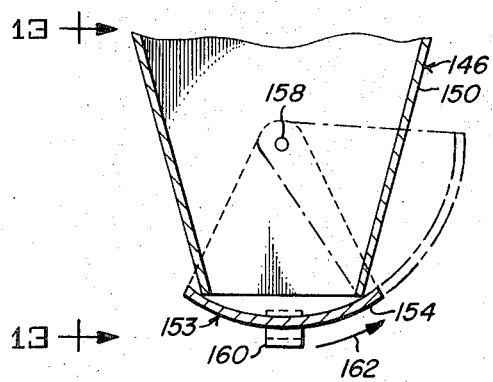
FIG. 12 is a fragmentary sectional view taken on the line 12—12 of FIG. 11.
Figure 13:
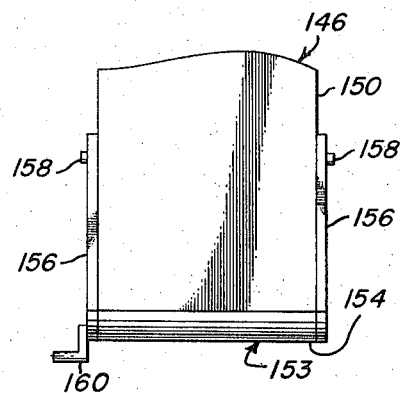
FIG. 13 is a fragmentary sectional view taken on the line 13—13 of FIG. 12.

As seen in FIGS. 11, 12 and 13, a modified refuse container 146 is shown as being fixedly attached to a mounting means 148. The refuse container 146 is shown as a substantially rectangular enclosure or housing 150 having a refuse receiving opening formed in the top thereof. Suitable access lids 152 are hingedly mounted on the housing 150 to permit depositing refuse in the container in the normal manner. The bottom portion of refuse container 146 is provided with a refuse dumping opening which is selectively opened and closed by closing means 153 which comprises an arcuate bottom portion 154 which has upwardly extending arms 156 on either side thereof. The upwardly extending arms 156 are connected by pivot pins 158 to the sides of the housing 150. The arcuate bottom portion 154 is provided with an actuation lug 160 extending therefrom so that the passing nonstop collection vehicle will contact the lug 160 and move the closing means 153 in the direction of arrow 162 from the solid line position shown in FIG. 12 to the dash line position.

As seen best in FIGS. 1, 2, 3 and 6, the refuse collection vehicle is provided with an actuation means 164. The actuation means in this embodiment comprises a bumper wheel 166 which may be carried on a laterally extending support arm 168 suitably carried on the front portion of the vehicle as shown in FIGS. 1 and 6, or as shown in FIGS. 2 and 3, the bumper wheel 166 may be carried on spring-arms 170 extending from the forward portion of the tray 24. It will be noted that both methods of mounting the bumper wheel position it in front of the tray 24 and in alignment therewith.

FIG. 6 is a schematic representation showing three positions of the refuse container during the passing of the refuse collection vehicle. Position A shows the refuse container in its upright or refuse receiving state. As the refuse collection vehicle 20 approaches position A in the direction of arrow 172, actuation means 164 will contact refuse container 22 and cause it to rotate in the direction of arrow 174 about its pivot axis 111. The container 22 will rotate about the axis to its inverted or refuse dumping state as shown at position B. The container 22 will be yieldingly held in the inverted position by the stop means 119 as hereinbefore described. When the container 22 reaches the inverted position as shown at position B, the refuse vehicle 20 will have proceeded along the collection path to a point where the forward portion of the tray 24 is directly under the opening 108 of the refuse container 22. As seen at position B, when the container 22 is inverted, the lid 100 will have moved to the open position, and the refuse contained within the container will empty into the tray. As the vehicle 20 proceeds along the path, the rear portion of tray 24 wil contact the lid 100 forcing it towards the closed position, and an upper bumper wheel 176, suitably mounted on the vehicle 20, will contact the refuse container as shown at position C and cause it to rotate in the direction of arrow 178 back to the upright or refuse receiving state shown at position A.

FIG. 7 is similar to FIG. 6 in that it shows various positions of the refuse container as the vehicle passes in the direction of arrow 172. The vehicle 20 is provided with an alternate type of actuation means 180 attached to the side of the vehicle. The actuation means 180 is an elongated continuous cam rail 182 which comprises a first cam surface 184 which extends upwardly and angularly from the forward portion of the vehicle to a second cam surface 186 to a third cam surface 188 which slopes angularly downwardly towards the rear portion of the vehicle. The container 22 is provided with a suitable cam follower or roller 190, which extends laterally from the side of the container 98. As the vehicle approaches position A (FIG. 7), the first cam surface 184 of the rail 182 will contact the roller 190 causing it to ride up the rail thus rotating the container about pivot axis 111 in the direction of arrow 174. As the roller reaches the second cam surface 186 of the rail 182 the container will have been pivoted to its inverted position as shown at point B and will be held in that position due to the substantially horizontal disposition of surface 186. The lid 111 will swing open during inversion of the container so that the contents thereof will empty into the tray 24. When the moving vehicle arrives at position C, the rear portion of the tray will contact the lid 111 and start its movement toward the closed position. The actuation means 180 may be provided with a second cam rail 192 which is positioned above the third cam surface 188 of the rail 182. The second cam rail 192 is positioned to cooperate with rear portion 188 of rail 182 to cause container 22 to rotate about pivot axis 111 in the direction of arrow 178 which will return the container to its upright or refuse receiving state as shown at point D.

While the principles of the invention have now been made clear in the preferred embodiments, there will be immediately obvious to those skilled in the art many modifications in structure, arrangements, proportions, the elements, and the materials used in the practice of the invention, and otherwise, which are particularly adapted to specific environments and operating requirements without departing from those principles. The appended claims are therefore intended to cover and embrace any such modifications within the limits only of the true scope of the invention.

What I claim is:

1. In a nonstop refuse collection system,
  a. a nonstop collection vehicle movable along a collection path, said vehicle adapted for receiving refuse therein;
  b. at least one refuse container positioned along the collection path, said container having a refuse receiving state and a refuse dumping state;
  c. a refuse storage enclosure movable with said vehicle;
  d. a refuse receiving tray mounted on said vehicle and exposed to extend laterally therefrom;
  e. emptying means positioned in said vehicle and in said tray for removing refuse from said tray;
  f. transfer means in said vehicle for receiving refuse from said emptying means and transferring the refuse to said storage enclosure, and
  g. actuation means on said vehicle for activating said container from the refuse receiving state to the refuse dumping state when said vehicle is adjacent to said container.

2. A nonstop refuse collection system as claimed in claim 1 wherein said emptying means comprises:
  a. a disc rotatably mounted in said vehicle and positioned to extend laterally therefrom into the lower portion of said tray, and b. means coupled to said disc for providing continuous rotary motion thereof.

3. A nonstop refuse collection system as claimed in claim 1 wherein said transfer means comprises:
 a. a chute within said vehicle and positioned to receive refuse from said emptying means, and
 b. ram means within said chute for moving the refuse deposited therein along the length thereof.

4. A nonstop refuse collection system as claimed in claim 1 wherein said vehicle further comprises means mounted in said vehicle between said emptying means and said transfer means for shredding the refuse.

5. In a nonstop refuse collection system,
 a. a nonstop collection vehicle movable along a collection path and adapted to receive refuse;
 b. mounting means adjacent to said collection path;
 c. a container body positioned on said mounting means and having an opening through which refuse is deposited in an upright position of said body and through which refuse is discharged in a dumping position of said body;
 d. stop means on said mounting means for limiting pivotal movement of said container body between an upright position and an inverted position, and
 e. actuation means on said vehicle engageable with said body to rotate the body from an upright position to a dumping position.

6. In a nonstop collection system,
 a. a nonstop collection vehicle movable along a collection path and adapted to receive refuse;
 b. a refuse container positioned along said collection path and having a refuse receiving state and a refuse dumping state, and
 c. actuation means on said vehicle for moving said container from its refuse receiving state to its refuse dumping state when said vehicle is adjacent to said container
  said actuation means comprising a cam rail mounted on said vehicle and adapted to engage said container to move it from its receiving state to its dumping state,
  said cam rail comprising,
 d. a first cam surface extending angularly upwardly from the forward portion of said vehicle for moving said container from its receiving state to its dumping state as said vehicle approaches said container;
 e. a second cam surface extending rearwardly from said first cam surface, said second cam surface being substantially horizontal for holding said container in its dumping state when said vehicle is adjacent to said container, and
 f. a third cam surface sloping angularly downwardly from said second cam surface for returning said container to its receiving state as said vehicle moves past said container.

7. A nonstop refuse collection system as claimed in claim 6 wherein a second cam rail is mounted on said vehicle to cooperate with said third cam surface for returning said refuse container to the refuse receiving state.

8. In a nonstop refuse collection system,
 a. a nonstop collection vehicle movable along a collection path, said vehicle adapted for receiving refuse therein;
 b. at least one refuse container positioned along the collection path, said container having a refuse receiving state and a refuse dumping state;
 c. a refuse storage enclosure movable with said vehicle,
 d. a refuse receiving tray mounted on said vehicle and exposed to extend laterally therefrom;
 e. emptying means positioned on said vehicle and including an element movable within said tray when the tray is in fixed position for removing refuse from said tray and transferring the refuse to said storage receptacle, and
 f. actuation means on said vehicle for engaging said container as the vehicle moves along the collection path and moving the container into a dumping position relative to said tray, maintaining the container in the dumping position as the tray moves past the container, and returning said tray to its refuse receiving position when the tray has completely passed the container.

9. In a nonstop refuse collection system,
 a. a nonstop collection vehicle movable along a collection path and including a body having a floor and a refuse receiving tray extending laterally from one side of said body substantially at the level of said floor;
 b. mounting means at one side of said collection path;
 c. a container body positioned on said mounting means and having an opening through which refuse is deposited in an upright position of said body and through which refuse is discharged in a dumping position of said body;
 d. actuation means on said vehicle substantially at the level of said floor and engageable with said container body to move the container body from an upright position to a dumping position to empty the container body into said tray while the truck is moving,
 e. means for limiting movement of said container body beyond the position to which it is moved by said actuating means, and
 f. means for transferring refuse in said tray into said body when the tray is in fixed position relative to said body in which it extends laterally therefrom.

* * * * *